(12) United States Patent
Kahn

(10) Patent No.: US 10,935,988 B2
(45) Date of Patent: Mar. 2, 2021

(54) ATMOSPHERIC THERMAL LOCATION ESTIMATION

(71) Applicant: The Government of the United States of America, as represented by the Secretary of the Navy, Arlington, VA (US)

(72) Inventor: Aaron David Kahn, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 266 days.

(21) Appl. No.: 16/178,296

(22) Filed: Nov. 1, 2018

(65) Prior Publication Data

US 2019/0129449 A1 May 2, 2019

Related U.S. Application Data

(60) Provisional application No. 62/580,536, filed on Nov. 2, 2017.

(51) Int. Cl.
| | | |
|---|---|---|
| *G05D 1/10* | (2006.01) | |
| *G05D 1/00* | (2006.01) | |
| *G08G 5/00* | (2006.01) | |
| *G06F 17/16* | (2006.01) | |
| *B64D 43/02* | (2006.01) | |
| *B64C 39/02* | (2006.01) | |

(52) U.S. Cl.
CPC ........... *G05D 1/105* (2013.01); *B64C 39/024* (2013.01); *B64D 43/02* (2013.01); *G05D 1/0005* (2013.01); *G06F 17/16* (2013.01); *G08G 5/0021* (2013.01); *G08G 5/0069* (2013.01); *G08G 5/0091* (2013.01); *B64C 2201/141* (2013.01)

(58) Field of Classification Search
CPC .............................. G05D 1/105; B64C 39/024
See application file for complete search history.

(56) References Cited

U.S. PATENT DOCUMENTS

| | | | |
|---|---|---|---|
| 6,089,506 A | 7/2000 | Scheffel | |
| 6,456,226 B1* | 9/2002 | Zheng | G01S 7/06 342/26 R |
| 7,431,243 B1* | 10/2008 | Allen | G05D 1/0005 244/16 |

(Continued)

FOREIGN PATENT DOCUMENTS

WO     2012-148296 A1     11/2012

OTHER PUBLICATIONS

Aaron D. Kahn. "Atmospheric Thermal Location Estimation", Journal of Guidance, Control, and Dynamics, vol. 40, No. 9 (2017), pp. 2363-2369.

(Continued)

*Primary Examiner* — Jess Whittington
(74) *Attorney, Agent, or Firm* — US Naval Research Laboratory; Roy Roberts

(57) ABSTRACT

A technique for finding and estimating the locations of atmospheric thermals for the purpose of exploiting the updraft energy to enable the aircraft to remain aloft while reducing or eliminating the need to expend fuel or energy and operational regardless of whether the aircraft is under powered flight or is gliding.

10 Claims, 5 Drawing Sheets
(2 of 5 Drawing Sheet(s) Filed in Color)

(56) References Cited

U.S. PATENT DOCUMENTS

| | | | |
|---|---|---|---|
| 7,437,225 B1 | 10/2008 | Rathinam | |
| 2007/0252035 A1* | 11/2007 | Hubbard, Jr. | G01S 17/95 244/75.1 |
| 2010/0228468 A1* | 9/2010 | D'Angelo | G08G 5/045 701/120 |
| 2010/0292871 A1 | 11/2010 | Schultz et al. | |
| 2014/0129056 A1* | 5/2014 | Criado | B64C 31/024 701/4 |
| 2016/0114903 A1* | 4/2016 | Claudel | B64D 45/00 701/3 |

OTHER PUBLICATIONS

Allen, M., "Guidance and Control of an Autonomous Soaring UAV," Tech. Rep. NASA/TM-2007-214611, NASA Dryden Flight Research Center, 2007.

Edwards, D., "Implementation Details and Flight Test Results of an Autonomous Soaring Controller," in "AIAA Guidance, Navigation, and Controls Conference," AIAA 2008-7244, 2008.

Edwards, D., "Autonomous Locator of Thermals (ALOFT) Autonomous Soaring Algorithm," Tech. Rep. NRL/FR/5712-15-10,272, US Naval Research Laboratory, 2015.

Edwards, D. and Silverberg, L., "Autonomous Soaring: The Montague Cross-Country Challenge," AIAA Journal of Aircraft, vol. 47, No. 5. DOI 10.2514/1.C000287.

Reichmann, H. "Cross Country Soaring" Thomson Publications 1978.

Klas Andersson, Isaac Kaminer, Vladimir Dobrokhodov, and Venanzio Cichella. "Thermal Centering Control for Autonomous Soaring; Stability Analysis and Flight Test Results", Journal of Guidance, Control, and Dynamics, vol. 35, No. 3, May-Jun. 2012, pp. 963-975.

International Search Report and Opinion dated Mar. 11, 2019 in PCT/US2018/058764.

\* cited by examiner

ATMOSPHERIC THERMAL LOCATION ESTIMATION

CROSS-REFERENCE TO RELATED APPLICATIONS

This application claims the benefit of U.S. Provisional Application 62/580,536 filed on Nov. 2, 2017, the entirety of which is incorporated herein by reference.

BACKGROUND

Aircraft endurance can be greatly increased by taking advantage of natural updrafts in the form of atmospheric thermals. Human pilots of both manned and unmanned gliders have demonstrated the ability to exploit thermals by remaining aloft for extended periods of time with no propulsion system (refs. 1 and 2). More recently methods have been developed to enable autonomous unmanned gliders to detect and locate thermals. Allen demonstrated a system based on a batch processing using a method of moments in ref. 3. Later, this method was extended upon by Edwards in refs. 4 and 5. Edwards used a grid-search approach in combination with a batch processing method to better estimate the location of the thermal and the thermal characteristic parameters. This approach was demonstrated by Edwards and Silverberg in ref. 6. The approach taken by Edwards was further extended by Kahn in ref. 7. Kahn refined the derivation of the variometer equations and utilized two extended Kalman filters to estimate the thermal location and thermal characteristic parameters. This approach was demonstrated in simulation.

The approaches taken by Allen and Edwards both involved the use of batch processing. This necessitates the need for large amounts of memory on the processor to hold the large arrays for the batch methods to work on. In addition, Edwards' approach of using a grid search required additional memory for each hypothesized thermal location. Therefore these approaches are not well suited for running on small, low-cost microcontrollers. To overcome these limitations, Kahn reformulated the problem as a recursive extended Kalman filter. This greatly reduced the memory requirements. All of these methods are based on data from an energy variometer. The energy variometer is a modification of the climb-rate indicator (ref. 8). Energy variometers work by accounting for the aerodynamic power gained or loss relative to the aircraft. They work well for pure gliders but do not work in general for powered aircraft. Edwards sought to overcome this limitation through extensive modeling of propulsion system power.

A need exists for efficient estimation of thermal location suitable for use in powered aircraft.

BRIEF SUMMARY

Described herein is a technique for finding and estimating the locations of atmospheric thermals for the purpose of exploiting the updraft energy to enable the aircraft to remain aloft while reducing or eliminating the need to expend fuel or energy.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Definitions

Figure 1:
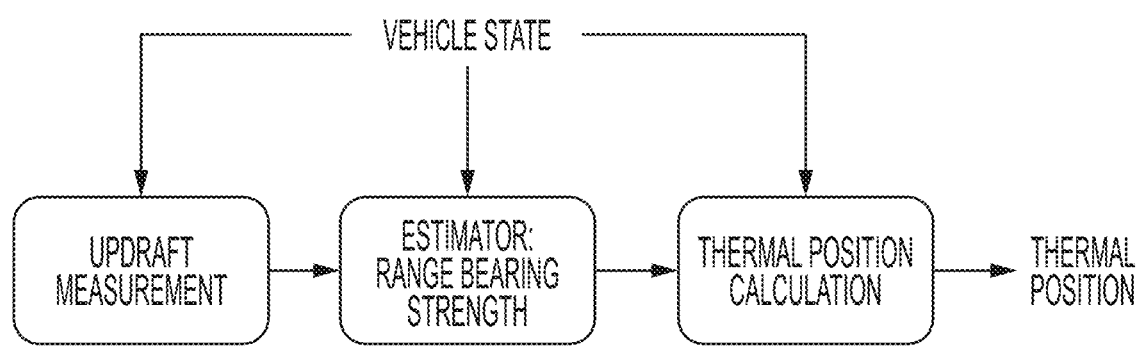
FIG. 1 illustrates a top level system diagram showing a signal flow according to the present invention.

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

Atmospheric thermals are local updrafts of air resulting from differential heating of the ground. This heating is can be caused by both natural and man-made sources. The most common source of energy is from sunlight. Manned and unmanned aircraft have demonstrated that by taking advantage of the energy in these updrafts, they can remain aloft for extended time periods without having to expend any internal fuel or energy. To take advantage of these thermals, a method must exist to detect and located the position of the thermal.

The method presented enables both manned and unmanned aircraft to detect and locate an atmospheric thermal thereby enabling the aircraft to take advantage of the energy available in the updraft. The method has been demonstrated in real hardware in a small unmanned glider during flight test, as well as in computer simulation.

Description and Operation

This technique represents several substantial improvements over past methods: (1) reduction of the estimation system to a recursive estimator (extended Kalman filter); (2) because the formulation is based in polar coordinates, it therefore intrinsically captures the structure of the atmospheric thermal; (3) the calculations do not require large memory arrays and therefore can be implemented on low-cost microcontrollers; and (4) because the updraft estimator is based on the kinematics and physics of the aerial vehicle, it remains operable even while the propulsion system is running In contrast, previous methods rely on batch data processing and time consuming grid searches, are done in Cartesian coordinates; require large batch data arrays to be stored; and their updraft detection is based on empirical curve fits for a particular aircraft.

The technique can be implemented in an autopilot. Preferable the autopilot is configured to control aircraft heading and in embodiments can control aircraft bank, yaw, pitch, and/or power.

A signal flow diagram is provided in FIG. 1. In a first step, the updraft measurement estimates the vertical motion of the wind (thermal updraft) using the inertial motion of aircraft and physical parameters of the aircraft. This method allows the updraft measurement to be done irrespective of the operation of the propulsion system. Parameterization allows for easy tailoring of the method to different air vehicles.

Next, using the updraft measurement, the Extended Kalman Filter (EKF) Estimator recursively estimates: range to center of thermal, bearing to center of thermal, and thermal strength. The thermal updraft model is assumed Gaussian, and is assumed to move with the relative wind. Dynamics of the vehicle relative to the thermal are provided by the vehicle state and estimate of the current wind speed and direction.

Then, using the range/bearing information from the Estimator and the current vehicle position (for example, latitude and longitude), the position of the position is calculated. This resulting position can then be used as a target orbit location for the guidance system on the air vehicle.

Updraft Measurement

Figure 2:
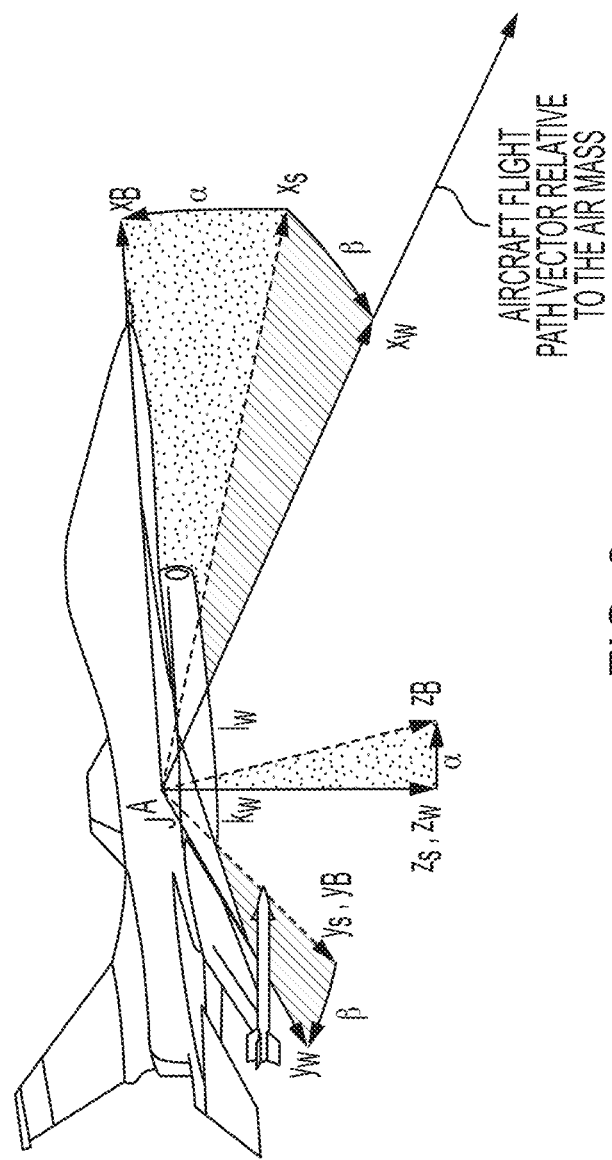
FIG. 2 illustrates angle of attack and side-slip angles.

The velocity vector of the airplane with respect to the air expressed in the body coordinate system can be written in terms of angle of attack $\alpha$, and the side-slip angle, $\beta$. These are shown in FIG. 2.

In Eq. 1 below, the value $V_T$ represents the true airspeed of the aircraft, for example as obtained by an air data system. In embodiments, an air data system receives input from a pitot sensor, a barometric sensor, and/or a dedicated pitot/static system.

$$V_b^B = \begin{bmatrix} V_T\cos(\alpha)\cos(\beta) \\ V_T\sin(\beta) \\ V_T\sin(\alpha)\cos(\beta) \end{bmatrix} \quad (1)$$

The rotation matrix to convert from body-frame to north-east-down (NED) frame defined by the attitude Euler angles (see ref. 9) is:

$$C^{EB} = \begin{bmatrix} \cos\Theta\cos\Psi & -\cos\Phi\sin\Psi + \sin\Phi\sin\Theta\cos\Psi & \sin\Phi\sin\Psi + \cos\Phi\sin\Theta\cos\Psi \\ \cos\Theta\sin\Psi & \cos\Phi\cos\Psi + \sin\Phi\sin\Theta\sin\Psi & -\sin\Phi\cos\Psi + \cos\Phi\sin\Theta\sin\Psi \\ -\sin\Theta & \sin\Phi\cos\Theta & \cos\Phi\cos\Theta \end{bmatrix} \quad (2)$$

The body-frame velocity with respect to the air, $V_b^B$, from Eq. 1 can then be written in the NED frame as:

$$V_b^E = C^{EB}V_b^B \quad (3)$$

By then examining only the Down axis components of Eq. 3 and the inertial velocity of the aircraft, $V_e^E$, one can calculate the vertical wind component as:

$$V_{atm} = (V_b^E - V_e^E)_D \quad (4)$$

where the updraft strength, $V_{atm}$, is defined as positive up.

It can be seen that this requires knowledge of $\alpha$ and $\beta$ to first compute Eq. 1. These aerodynamic angles can be estimated using the inertial measurements, air data system measurements, and physical properties of the aircraft. The lift and side-force on an aircraft can be written as follows (see ref. 9):

$$L = \bar{Q}S(C_{L_\alpha}\alpha + C_{L_0}) \quad (5)$$

$$Y = \bar{Q}SC_{Y_\beta}\beta \quad (6)$$

If the angle of attack and side-slip angles are small, then the lift and side-force are approximately aligned with the body axes such that:

$$L \approx -f_z m \quad (7)$$

$$Y \approx f_y m \quad (8)$$

Using Eqs. 5 and 7, the angle of attack is estimated using the body z-axis specific force measurement as:

$$\alpha = \frac{-f_z m}{\bar{Q}SC_{L_\alpha}} - \frac{C_{L_0}}{C_{L_\alpha}} \quad (9)$$

where m is the mass, S is the reference wing area, $C_{L_0}$ is the zero-angle of attack lift coefficient, and $C_{L_\alpha}$ is the lift-curve slope. The dynamic pressure, $\bar{Q}$ is provided by the air data system.

The side-slip angle is also estimated using Eqs. 6 and 8 as:

$$\beta = \frac{f_y m}{\bar{Q}SC_{Y_\beta}} \quad (10)$$

where $C_{Y_\beta}$ is the side-force slope. The body y-axis accelerometer signal is $f_y$.

It was found useful in practice to low-pass filter these estimates to remove noise from the accelerometer signals. In addition, it was found useful to further low-pass filter $V_{atm}$ to smooth the result.

Thermal Position Kalman Filter

A thermal is a rising column of warm air which tends to drift relative to the ground due to wind. In order to design the estimation system to follow a thermal, a model thereof was required. The thermal model described herein is based in part on the work from Edwards (refs. 4, 5). It is a Gaussian parameterization based on thermal radius R and strength W.

$$V_{atm} = We^{-(D/R)^2} \quad (11)$$

The value D is the distance the aircraft is from the center of the thermal.

Using the given model, an extended Kalman filter (see ref. 10) was designed to estimate the given states:

$$\hat{X} = [\hat{D} \hat{\lambda} \hat{W}]^T \in \Re^3 \quad (12)$$

Figure 3:
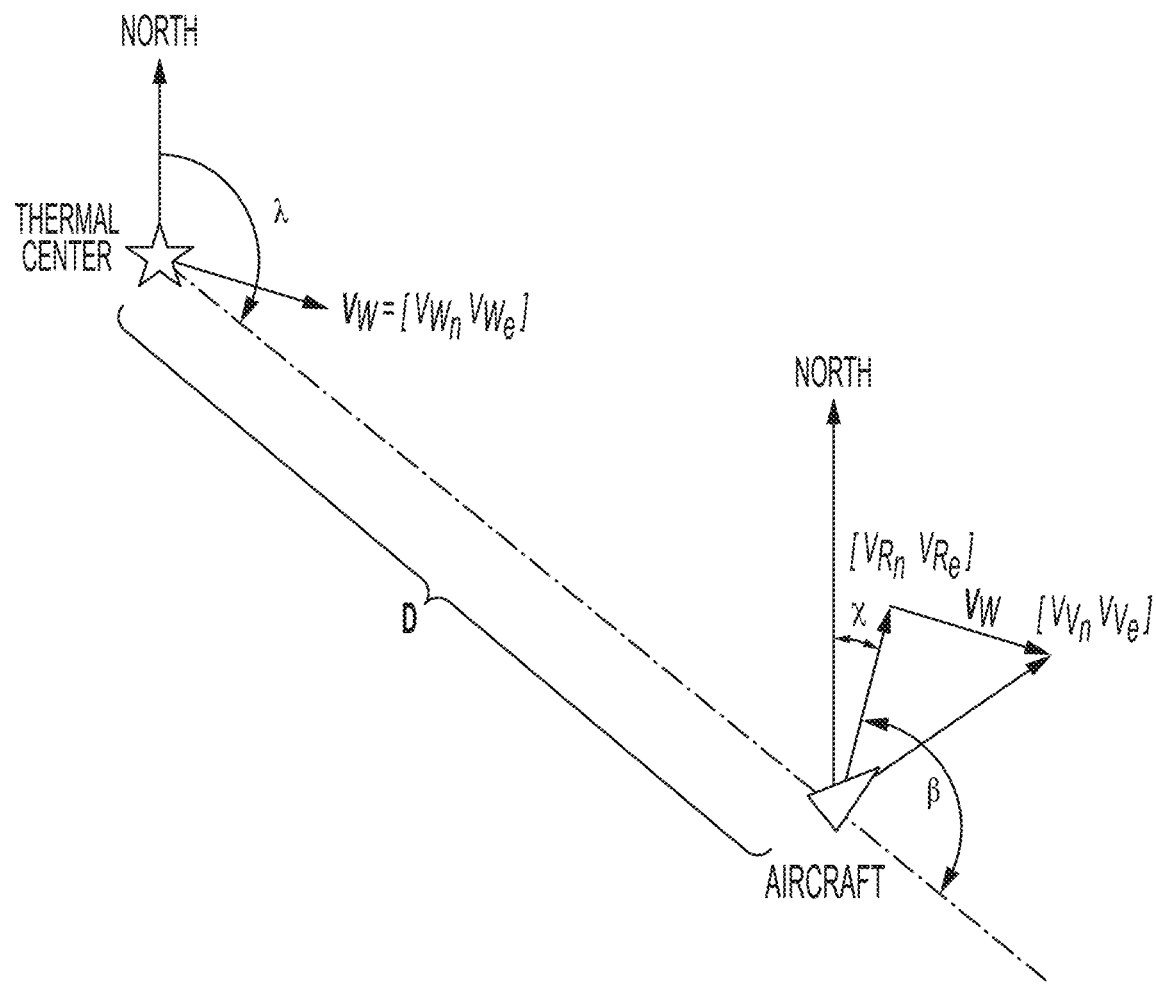
FIG. 3 provides an example of thermal estimation geometry.

The thermal characteristic radius, R, in Eq. 11 is provided as a fixed parameter, and is chosen as a function of the minimum turn radius of the aircraft. The geometry of the estimator is shown in FIG. 3.

The position of the thermal relative to the aircraft is computed in polar coordinates. In addition, the thermal is assumed to move with the relative winds. To account for the motion of the thermal with the wind, a relative velocity is computed as:

$$\left. \begin{array}{l} V_{R_n} = v_n - w_n \\ V_{R_e} = v_e - w_e \end{array} \right\} \quad (13)$$

$$V_R = \sqrt{V_{R_n}^2 + V_{R_e}^2} \quad (14)$$

The aircraft's inertial north and east velocity components, $v_n$ and $v_e$, are provided by the navigation system. The wind velocity components $w_n$ and $w_e$ are provided by the navigation system or an auxiliary wind estimation Kalman filter (see ref. 7). The resulting relative velocity components, $V_{R_n}$ and $V_{R_e}$, are then used to compute the ground track, X.

$$\chi = a\tan 2(V_{R_e}, V_{R_n}) \quad (15)$$

The function a tan 2(•, •) in Eq. 15 is the 4-quadrant arc-tangent function. The bearing from the center of the thermal is λ, and the included angle between the relative velocity and line-of-bearing is defined as β, which is shown in FIG. 3.

$$\hat{\beta} = \hat{\lambda} - \chi \quad (16)$$

Using the $\hat{\beta}$ and the $V_R$, the rate of change of the states is computed as:

$$\left. \begin{array}{l} \dot{\hat{D}} = V_R \cos(\hat{\beta}) - \dfrac{\hat{D}}{\tau_D} \\[4pt] \dot{\hat{\lambda}} = \dfrac{-V_R \sin(\hat{\beta})}{\hat{D}} \\[4pt] \dot{\hat{W}} = -\dfrac{\hat{W}}{\tau_W} \end{array} \right\} \quad (17)$$

The distance and strength dynamics in Eq. 17 incorporate decay terms which will drive the distance and strength towards zero if no thermal or motion is present. These terms were found to assist the estimator in converging to the correct solution more quickly. Taking the partial derivatives of Eq. 17 with respect to the states results in the state transition matrix being defined as:

$$A = \begin{bmatrix} -\dfrac{1}{\tau_D} & -V_R \sin(\hat{\beta}) & 0 \\[6pt] \dfrac{V_R \sin(\hat{\beta})}{\hat{D}^2} & -\dfrac{V_R \cos(\hat{\beta})}{\hat{D}} & 0 \\[6pt] 0 & 0 & -\dfrac{1}{\tau_W} \end{bmatrix} \quad (18)$$

The derivative of the covariance matrix, $P \in \mathfrak{R}^{3;3}$, is computed using the state transition matrix from Eq. 18 as $$\dot{P} = AP + PA^T + Q \quad (19)$$

where the matrix $Q \in \mathfrak{R}^{3;3} > 0$ is the process noise matrix. The dynamics from Eqs. 17 and 19 are then integrated forward in time forming the prediction step. After integration the distance and strength states are limited. The distance state is bound to $\hat{D}_{min} \leq \hat{D} \leq \hat{D}_{max}$ and the strength state is bound to $\hat{W}_{min} \leq \hat{W}$. The bearing state is wrapped to $\pm \pi$.

The update step is based on the thermal model presented in Eq. 11. The estimate of the thermal updraft strength is given as:

$$\kappa = \max(e^{-(\hat{D}/R)^2}, 0.001) \quad (20)$$

$$V_{atm}^{\wedge} = \hat{W}\kappa \quad (21)$$

where the function max(•, •) will return the largest of the two arguments. Equation 20 was found necessary to prevent the measurement matrix from going to zero. Taking the partial derivative of Eq. 21 with respect to the states, the measurement matrix is:

$$C = \begin{bmatrix} -\dfrac{2\hat{D}}{R^2} V_{atm}^{\wedge} & 0 & \kappa \end{bmatrix} \quad (22)$$

Using Eq. 22 the Kalman update step is then performed as:

$$\left. \begin{array}{l} K = PC^T (CPC^T + \xi)^{-1} \\ \hat{X}^+ = \hat{X}^- + K(V_{atm} - V_{atm}^{\wedge}) \\ P^+ = (I - KC)P^- \end{array} \right\} \quad (23)$$

where the measurement update weight $\xi > 0$.

Thermal Position Calculation

Once the extended Kalman filter estimates the range and bearing, the position of the thermal can be computed in geographic coordinates using the position of the aircraft. The thermal position is computed as:

$$\left. \begin{array}{l} P_N = P_{V_N} - \hat{D}\cos(\hat{\lambda}) \\ P_E = P_{V_E} - \hat{D}\sin(\hat{\lambda}) \end{array} \right\} \quad (24)$$

where the North/East coordinates if the aircraft position are $P_{V_n}$ and $P_{V_e}$. The aircraft position can be provided by its navigation system (for example, using GPS, inertial navigation, celestial navigation, dead reckoning, radio navigation, and combinations thereof).

Examples

The method was tested extensively in software-in-the-loop simulation. It was also implemented in a custom miniature autopilot and flown on an unmanned aerial vehicle (UAV) in the form of electric-powered motor glider with a 1.4 meter wingspan. With only a small amount of manual tuning of the parameters of the algorithm, the method was able to detect and estimate the position of thermals. The algorithm was coupled to the autopilot's guidance system via a simple logic state machine. This enabled the method to guide the glider in circling the estimated thermal position. The results of this flight are shown in FIGS. 4 and 5.

Figure 4:
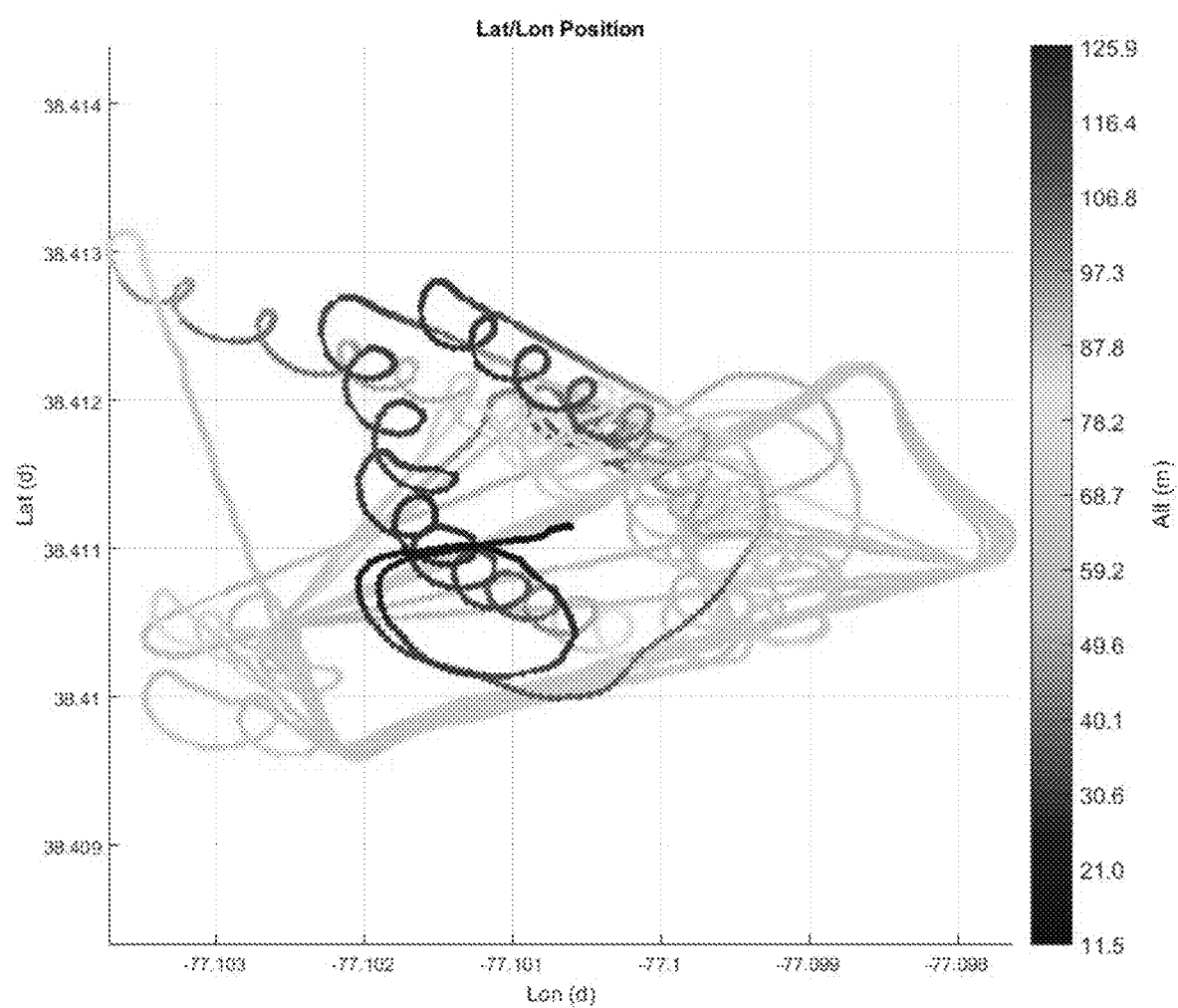
FIG. 4 is a latitude/longitude plot of a glider path during test flight. Altitude gain is illustrated in color code.

The flight path of the glider during the test flight is shown in FIG. 4. The altitude is color-coded in this plot. The periods of time where the method was tracking a thermal resulted in a drifting circling behavior. During this time the altitude gain is clear from the color code. Once the thermal dissipated, the logic block commanded the guidance system to return to the pre-programmed flight plan.

Figure 5:
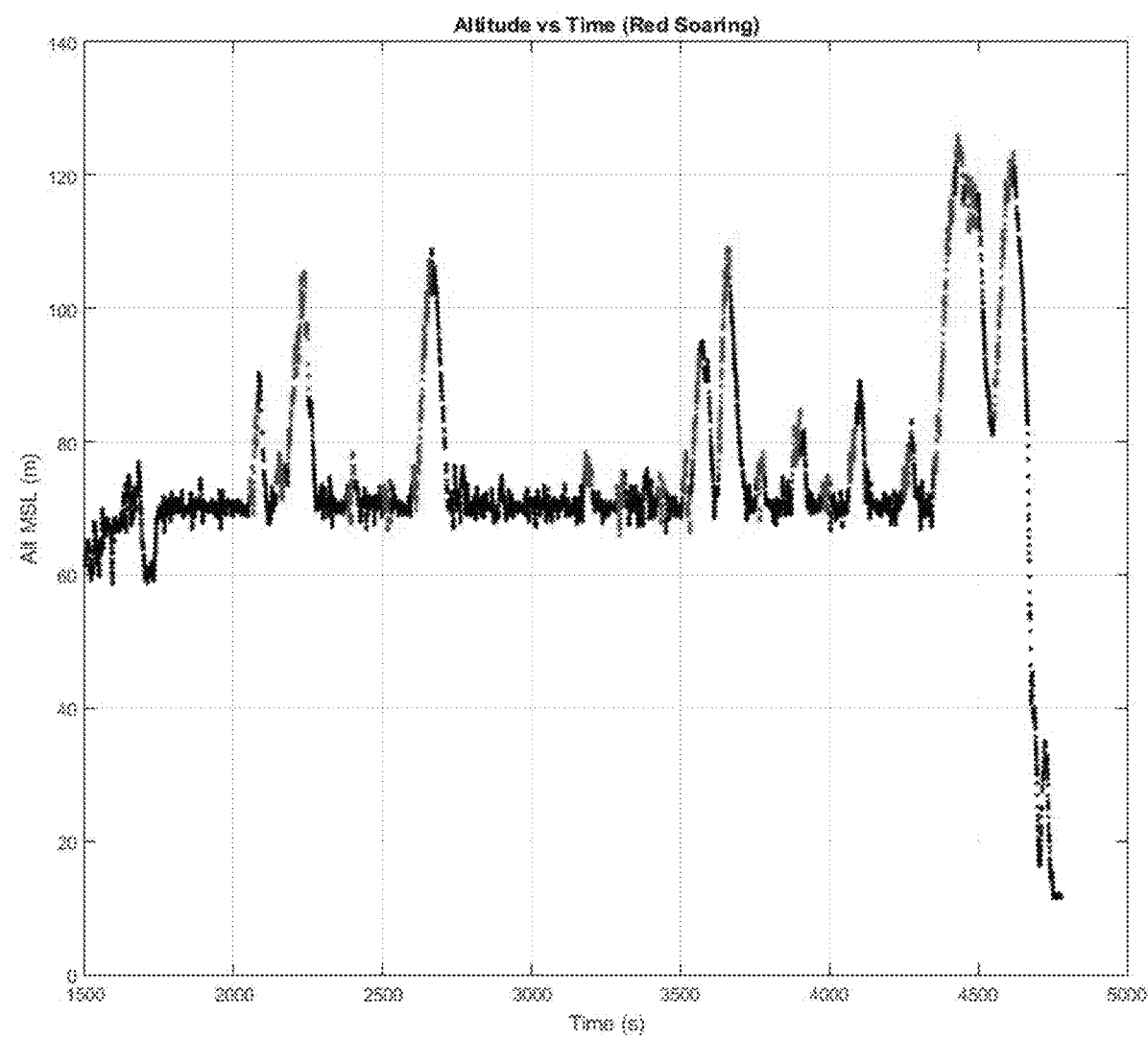
FIG. 5 is an altitude plot of glider flight. Lighter colored sections are periods of time where the algorithm detected and tracked a thermal, showing altitude gain during those periods.

Altitude gain over the nominal flight plan altitude is shown in FIG. 5. The red traces in this plot are the times when the method presented detected and tracked a thermal. It can be clearly seen that the altitude increased during these periods, indicating that the method correctly detected and tracked an actual thermal updraft. When not tracking a thermal, the autopilot maintained altitude using the motor. This demonstrates the ability of the updraft measurement method to measure the thermal updraft even with the motor on, something not believed possible with prior methods.

Advantages

Major advantages of this new method over the current state of the art are: the ability to detect and measure thermal updrafts independent of the propulsion system operation, the updraft measurement is based on physical airplane parameters, and the thermal position estimation method is memory efficient and is based on a recursive extended Kalman filter. These are significant improvements of the current state of the art in atmospheric thermal updraft detection and position estimation.

The thermal updraft measurement method described herein represents a major improvement over the current state of the art. First, this method will work independent of the propulsion system on the aircraft. This enables this method to be used on any fixed-wing airplane, which was not possible using prior methods. Second, the underlying parameters used are based on physically meaningful values which can be measured or estimated for the specific aircraft. The current state of the art requires empirically gathered curve fit data which is highly dependent on the configuration of the aircraft. The current methods therefore cannot be transitioned easily between different aircraft, or the same aircraft with different configurations, such as mass (including variations in total mass depending on variations in installed equipment, payload, and fuel, as well as fore/aft balance of the center of mass), landing gear position, wing-flap configuration, or propulsion system.

The thermal position estimation method described herein represents an improvement over the current state of the art by not requiring large arrays to be stored in memory and processed as a batch method. This new method utilizes an extended Kalman filter which is a recursive estimator, requiring only the state vector (3-elements) and covariance matrix (3×3 matrix) to be stored in memory. This enables the presented method to be implemented on low-cost microcontroller-based hardware, which was used to perform the flight test.

Thus, this technique enables an increase in range and endurance of an aircraft without having to add additional fuel/batteries. It is possible that the technique could be implemented in an aircraft without requiring any changes to its hardware, only software. Furthermore, the technique is applicable to both manned and unmanned aircraft. Because the method is parameterized, it can be quickly tailored to a variety of aircraft types.

Alternatives

Thermal updraft measurement could utilize a more complex estimator for the calculation of angle of attack and side-slip. The thermal position estimator could be implemented in forms other than an extended Kalman Filter. Examples include but are not limited to sigma-point filters, square-root filters, neural-adaptive filters, or complimentary filters. Additionally, the thermal characteristic radius, R, may be included in the state vector for the thermal position estimation.

CONCLUDING REMARKS

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES

1. Reichmann, H., *Cross-Country Soaring*, Thomas Publications 1978.
2. Thornburg, D., *Old Buzzard's Soaring Book*, Pony Express, Albuquerque, N. Mex., 1993.
3. Allen, M., "Guidance and Control of an Autonomous Soaring UAV," Tech. Rep. NASA/TM-2007-214611, NASA Dryden Flight Research Center, 2007
4. Edwards, D., "Implementation Details and Flight Test Results of an Autonomous Soaring Controller," in "AIAA Guidance, Navigation, and Controls Conference," AIAA 2008-7244, 2008.
5. Edwards, D., "Autonomous Locator of Thermals (ALOFT) Autonomous Soaring Algorithm," Tech. Rep. NRL/FR/5712-15-10,272, US Naval Research Laboratory, 2015.
6. Edwards, D. and Silverberg, L., "Autonomous Soaring: The Montague Cross-Country Challenge," *AIAA Journal of Aircraft*, Vol. 47, No. 5. DOI 10.2514/1.0000287.
7. Kahn, A., "Atmospheric Thermal Location Estimation," *Journal of Guidance, Control, Dynamics*, Vol. 40, No. 9 (2017), pp. 2363-2369.
8. Welch, A., Welch, L., and Irving, F., New Soaring Pilot, Thomas Knauff, 1991.
9. Stevens, B. L. and Lewis, F. L., *Aircraft Control and Simulation*, John Wiley and Sons, New York, 1992.
10. Gelb, A., *Applied Optimal Estimation*, The MIT Press, Cambridge, Mass., 1974.

What is claimed is:

1. A method of locating atmospheric thermals for improved aircraft endurance, the method comprising:
    (a) receiving data from at least two instruments aboard an aircraft flying in air, the instruments providing inertial navigation system measurements, air-data pressure measurements, and/or GPS sensor measurements;
    (b) calculating a vertical velocity of atmospheric wind using the data;
    (c) from the vertical velocity of atmospheric wind, calculating aircraft distance and bearing from a center an atmospheric thermal and strength of the atmospheric thermal; and then
    (d) ascertaining a current position of the aircraft and using this position to calculate the position of the thermal in geographic coordinates,
    wherein the calculating the vertical velocity of atmospheric wind comprises:
    (1) calculating an angle of attack and angle of side slip of the aircraft with respect to the air;
    (2) calculating components of velocity of the aircraft with respect to the air in the reference frame of the aircraft using true airspeed measurement from an air-data system or pitot tube;
    (3) calculating velocity of the aircraft with respect to the air in the reference frame of Earth using the rotation matrix provided by the inertial navigation system or an aircraft attitude measurement; and
    (4) calculating the vertical velocity of the wind by differencing the vertical velocity of the aircraft with respect to Earth with the vertical velocity of the aircraft with respect to the air.

2. The method of claim 1, wherein the calculating of the angle of attack and angle of side slip of the aircraft with respect to the air step further comprises:
   (1) calculation of the angle of attack via measurement from angle of attack vane or sensor and/or a combination of a z-axis accelerometer, dynamic pressure measurement, and aircraft-specific parameters; and
   (2) calculation of the angle of side slip via measurement from side slip vane or sensor and/or using a y-axis accelerometer, dynamic pressure measurement, and aircraft specific parameters.

3. A method of locating atmospheric thermals for improved aircraft endurance, the method comprising:
   (a) receiving data from at least two instruments aboard an aircraft flying in air, the instruments providing inertial navigation system measurements, air-data pressure measurements, and/or GPS sensor measurements;
   (b) calculating a vertical velocity of atmospheric wind using the data;
   (c) from the vertical velocity of atmospheric wind, calculating aircraft distance and bearing from a center an atmospheric thermal and strength of the atmospheric thermal; and then
   (d) ascertaining a current position of the aircraft and using this position to calculate the position of the thermal in geographic coordinates,
   wherein the calculating aircraft distance and bearing from a center an atmospheric thermal and strength of the atmospheric thermal further comprises:
   (1) a three-state Extended Kalman Filter, or Unscented Kalman Filter, or Sigma-Point Filter;
   (2) a process model of the motion of the aircraft with respect to the thermal in polar coordinates; and
   (3) a measurement model of the thermal as a Gaussian parameterized with a radius, strength, and distance.

4. The method of claim 3, wherein the Extended Kalman Filter comprises:
   (1) a state vector of aircraft distance from thermal center, aircraft bearing from thermal center with respect to True North, and thermal strength;
   (2) a 3×3 element covariance matrix;
   (3) a 3×3 process noise matrix;
   (4) a 1×3 measurement matrix; and
   (5) a 1×1 measurement weight.

5. The method of claim 3, wherein the process model of the motion of the aircraft with respect to the thermal in polar coordinates further comprises:
   (1) measurement of the motion of the aircraft with respect to Earth in the reference frame of Earth from an inertial navigation system or GPS sensor;
   (2) measurement of a wind vector with respect to Earth in the reference frame of Earth from a wind estimation system, air-data system, or direct measurement; and
   (3) calculating rates of change of distance and bearing from the thermal using the aircraft motion measurement and wind vector measurement.

6. The method of claim 1, wherein the calculating of the position of the thermal in geographic coordinates using the aircraft position step comprises:
   (1) converting the aircraft distance and bearing from a center an atmospheric thermal from polar coordinates to Cartesian coordinates;
   (2) applying the Cartesian coordinates to the current aircraft position as reported by an inertial navigation system or GPS sensor.

7. An autopilot configured to locate atmospheric thermals for improved aircraft endurance, the autopilot comprising instructions for:
   (a) receiving data from at least two instruments aboard an aircraft flying in air, the instruments providing inertial navigation system measurements, air-data pressure measurements, and/or GPS sensor measurements;
   (b) calculating a vertical velocity of atmospheric wind using the data;
   (c) from the vertical velocity of atmospheric wind, calculating aircraft distance and bearing from a center an atmospheric thermal and strength of the atmospheric thermal; and then
   (d) ascertaining a current position of the aircraft and using this position to calculate the position of the thermal in geographic coordinates,
   wherein the calculating the vertical velocity of atmospheric wind comprises:
   (1) calculating an angle of attack and angle of side slip of the aircraft with respect to the air;
   (2) calculating components of velocity of the aircraft with respect to the air in the reference frame of the aircraft using true airspeed measurement from an air-data system or pitot sensor;
   (3) calculating velocity of the aircraft with respect to the air in the reference frame of Earth using the rotation matrix provided by the inertial navigation system or aircraft attitude measurement; and
   (4) calculating the vertical velocity of the wind by differencing the vertical velocity of the aircraft with respect to Earth with the vertical velocity of the aircraft with respect to the air.

8. The autopilot of claim 7, operably connected to the inertial navigation sensor, the GPS sensor, the pitot sensor, a barometric sensor, and/or a dedicated pitot/static system.

9. The autopilot of claim 7, configured to receive data from an angle of attack vane and/or a side slip vane.

10. An aircraft comprising:
    an autopilot configured to locate atmospheric thermals for improved aircraft endurance, wherein the autopilot comprises instructions for:
    (a) receiving data from at least two instruments aboard an aircraft flying in air, the instruments providing inertial navigation system measurements, air-data pressure measurements, and/or GPS sensor measurements;
    (b) calculating a vertical velocity of atmospheric wind using the data;
    (c) from the vertical velocity of atmospheric wind, calculating aircraft distance and bearing from a center an atmospheric thermal and strength of the atmospheric thermal; and then
    (d) ascertaining a current position of the aircraft and using this position to calculate the position of the thermal in geographic coordinates,
    wherein the calculating the vertical velocity of atmospheric wind comprises:
    (1) calculating an angle of attack and angle of side slip of the aircraft with respect to the air;
    (2) calculating components of velocity of the aircraft with respect to the air in the reference frame of the aircraft using true airspeed measurement from an air-data system or pitot tube;
    (3) calculating velocity of the aircraft with respect to the air in the reference frame of Earth using the rotation matrix provided by the inertial navigation system or aircraft attitude measurement; and (4) calculating the vertical velocity of the wind by differencing the vertical velocity of the aircraft with respect to Earth with the vertical velocity of the aircraft with respect to the air.

\* \* \* \* \*